July 8, 1969 H. C. GOHS 3,453,672
THREADED LOCK WASHER AND METHOD FOR FABRICATION THEREOF
Original Filed March 16, 1966 Sheet 1 of 5

INVENTOR
HOWARD C. GOHS

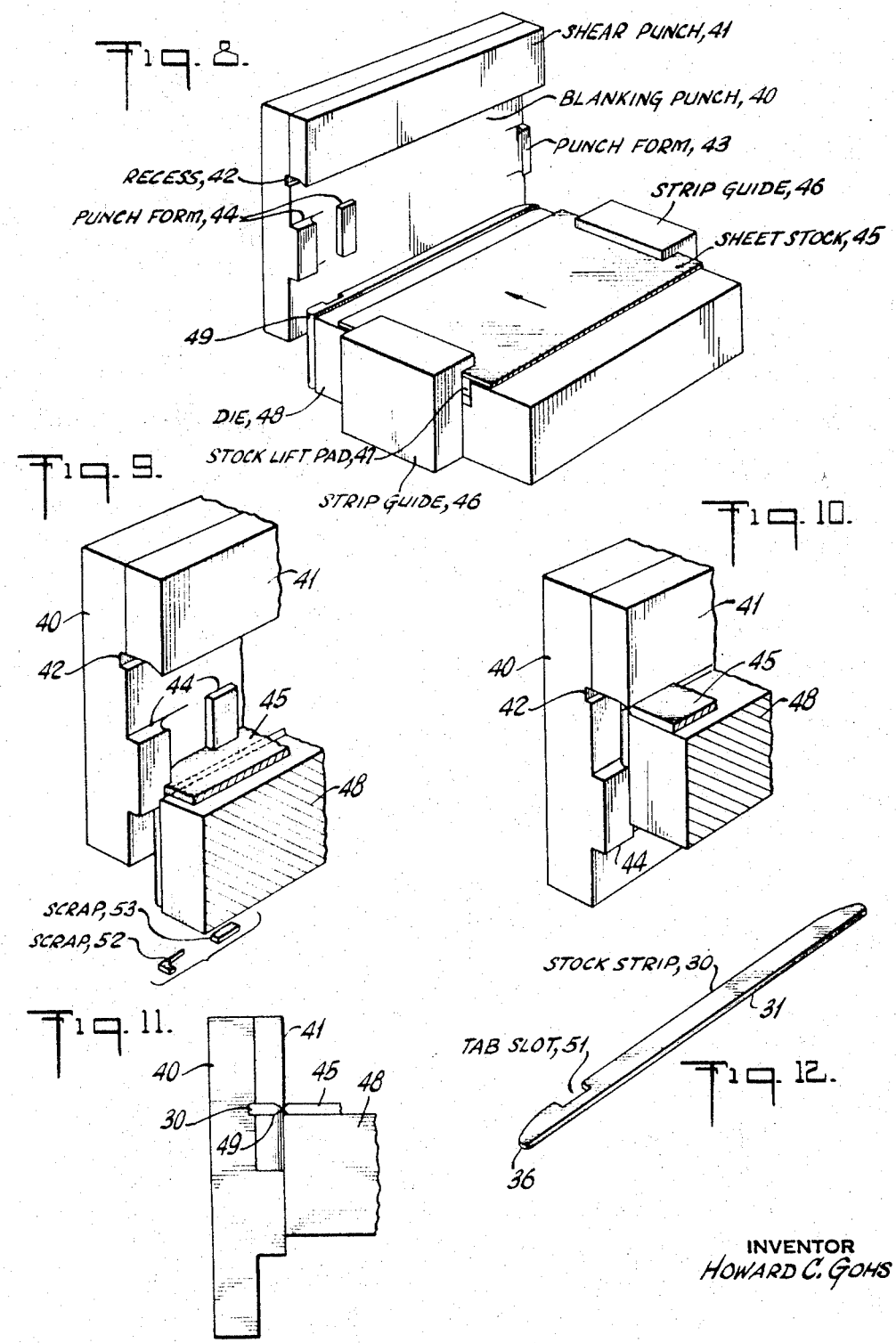

July 8, 1969 H. C. GOHS 3,453,672
THREADED LOCK WASHER AND METHOD FOR FABRICATION THEREOF
Original Filed March 16, 1966 Sheet 3 of 5
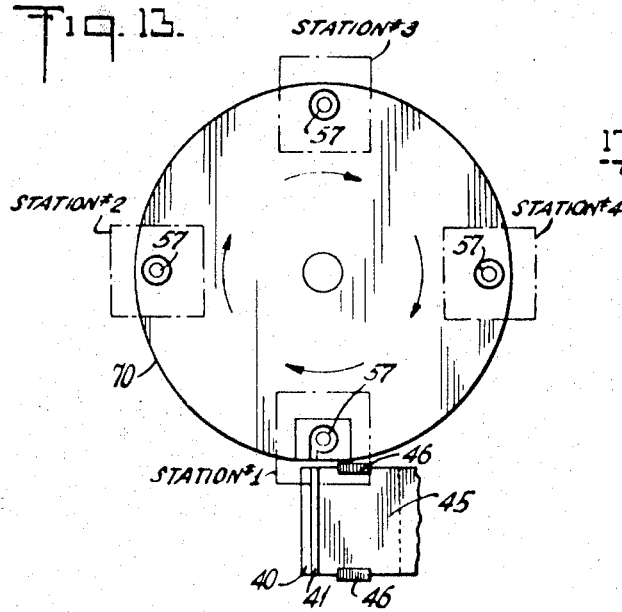
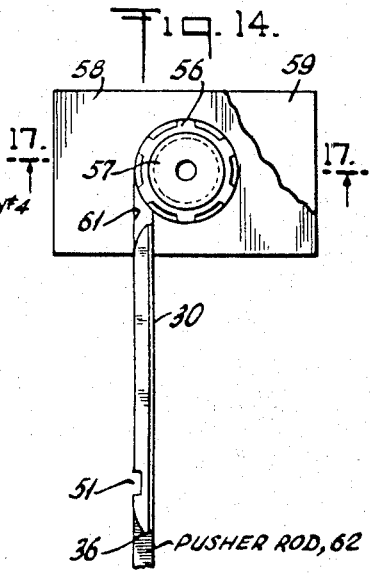
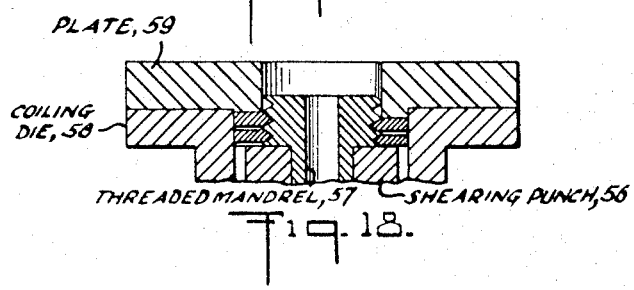
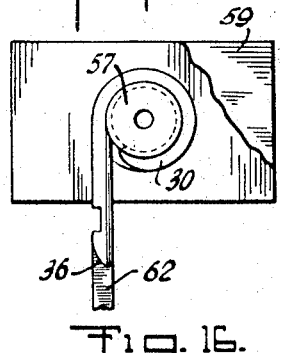
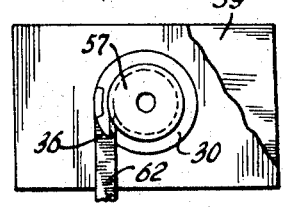
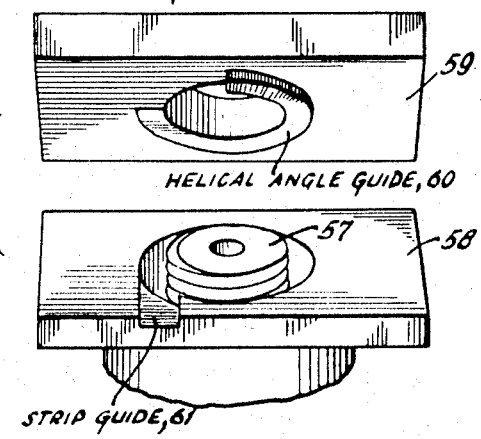
INVENTOR
HOWARD C. GOHS
BY
M. J. Rackman
ATTORNEY

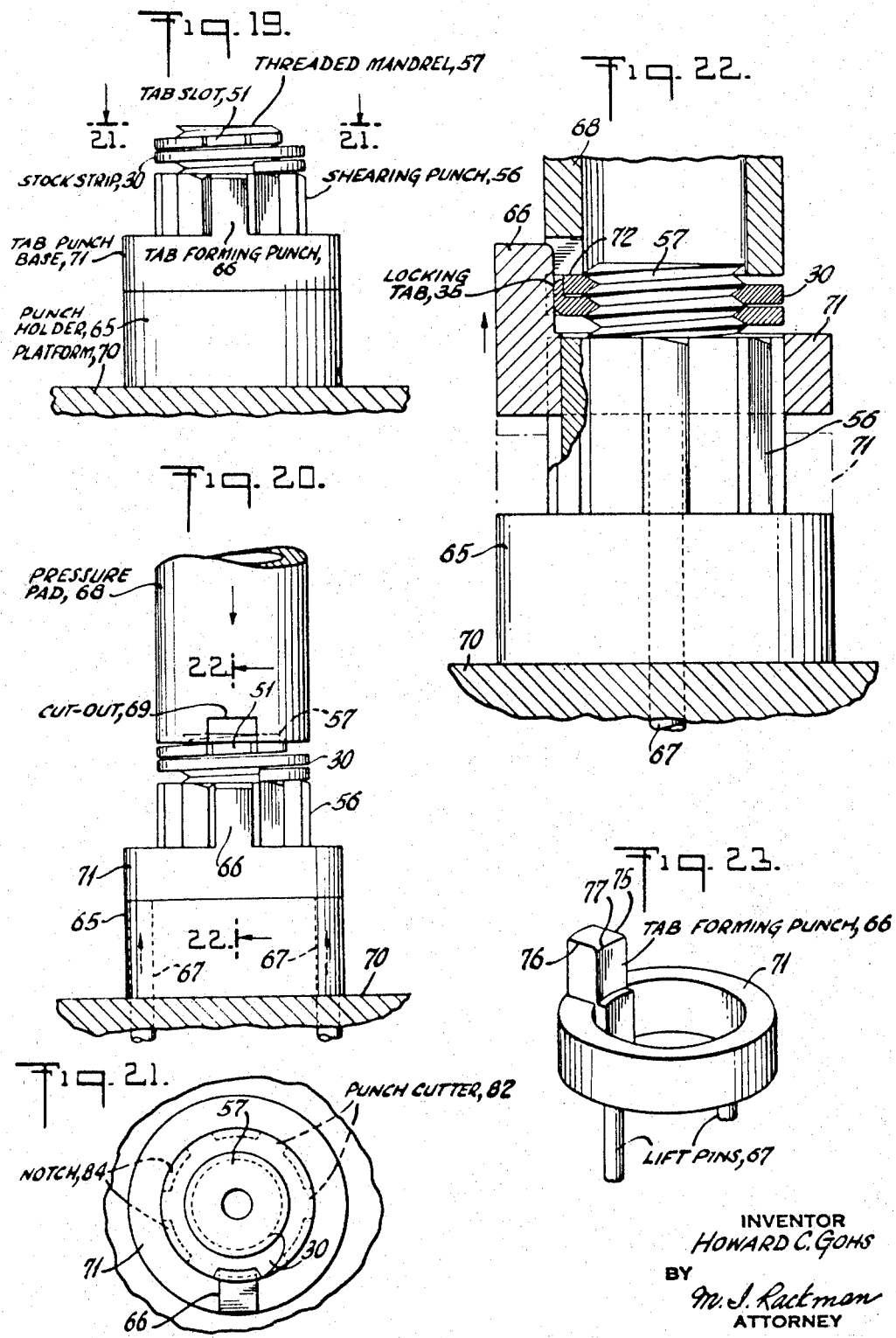

July 8, 1969          H. C. GOHS          3,453,672
THREADED LOCK WASHER AND METHOD FOR FABRICATION THEREOF
Original Filed March 16, 1966          Sheet 5 of 5
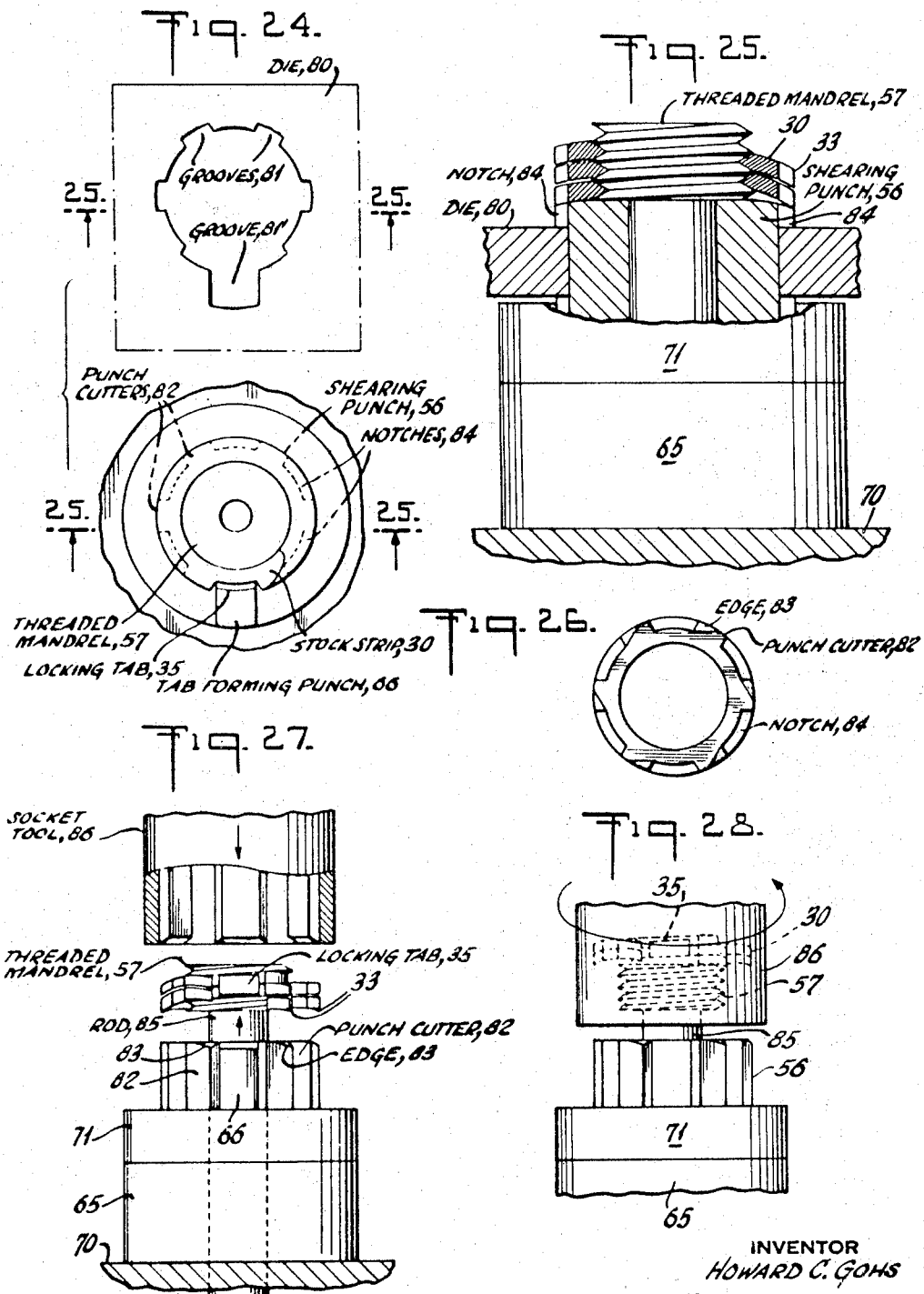
INVENTOR
HOWARD C. GOHS
BY
M. J. Rackman
ATTORNEY United States Patent Office 3,453,672
Patented July 8, 1969

3,453,672
THREADED LOCK WASHER AND METHOD FOR FABRICATION THEREOF
Howard C. Gohs, Syosset, N.Y., assignor to Electrical Fittings Corporation, Farmingdale, N.Y., a corporation of New York
Original application Mar. 16, 1966, Ser. No. 534,837, now Patent No. 3,397,726, dated Aug. 20, 1968. Divided and this application Nov. 13, 1967, Ser. No. 703,494
Int. Cl. B21d 53/20; B61d 39/24
U.S. Cl. 10—73                                                   14 Claims

ABSTRACT OF THE DISCLOSURE

The process and apparatus for fabricating a lock washer made of a strip of coil stock material. The fabricating apparatus is a multi-station forming die punch device wherein a strip of material is cut from stock and wound on a mandrel; a locking tab is formed on the washer for preventing unwinding of the finished product. The fabricating apparatus then forms the remainder of the washer, its notches and gripping edges.

---

This application is a division of the presently pending patent application Ser. No. 534,837, entitled "Threaded Lock Washer and Method for Fabrication Thereof," filed Mar. 16, 1966 and now Patent No. 3,397,726.

This invention relates to threaded lock washers, and more particularly to threaded lock washers having improved locking characteristics and methods and equipment for the fabrication thereof.

Threaded lock washers, which are used in the millions each years, are essentially cylindrical bodies each having a threaded central bore and spaced gripping or biting tabs along its outer periphery. There are many uses for such washers, typical of these being the locking of a threaded pipe to an outlet box. Prior art washers have generally been fabricated by an appropriate stamping operation on sheet stock.

There are three major problems encountered in the use and fabrication of prior art lock washers. First, in the stamping operation up to 80% of the stock material may be wasted because the material which is punched out to form the central bore and the rounded periphery configuration is wasted. Second, in the manufacture of the prior art lock washer once the bore is formed it must be threaded, and the threading step is a relatively expensive one from the points of view of the initial cost of the threading equipment and the time which is required for the operation. Third, prior art lock washers are known to often work loose after attachment to an outlet box or similar device, due primarily to the difficulty of tapping smooth 100% threads.

In my copending application Ser. No. 394,160, filed Sept. 3, 1964, and entitled "Threaded Lock Washer," now Patent No. 3,260,293, there is disclosed an improved lock washer and a method for its construction. A strip of flat wire material, with a beveled edge, is wound to form a helical coil. The coil is wound such that the beveled edge of the strip defines a central threaded bore. The coil may then be stamped to form the gripping tabs. This method of fabrication is advantageous for three reasons. Because the wire strips which eventually form the final lock washers may be cut from sheet stock with very little material being wasted, a considerable savings is realized in the cost of the material. And because the beveled edge is formed on each strip before the winding operation, there is no need for the threading operation in the manufacturing process. (Additionally, a 100% thread is formed.) As for the final lock washer itself it is vastly superior to the prior art type of lock washer. If two turns are made in the winding operation, the final washer has the characteristics of two separate washers, one on top of the other. When the "combined" lock washer is used in practice and tightened to an outlet box, the outer convolution rotates slightly with respect to the inner convention which rests against the box wall. This slight rotation provides a dual locking characteristic which in the prior art can be obtained only with the use of two separate washers. A single washer constructed as described in my above-identified application is substantially foolproof from working loose after attachment.

It is a general object of this invention to provide a lock washer, and a method and equipment for the fabrication thereof which are improvements over those disclosed in my above-identified application.

It has been found that electricians and other persons, when using the lock washer disclosed in my above-identified application, are sometimes apt to ruin it. A lock washer is generally tightened to an outlet box or other wall by placing a screwdriver against one of the gripping tabs and hitting it with a hammer. The force applied by the hammer causes the washer to turn on the threaded pipe and the gripping tabs to bite into the box wall. If an electrician follows the same procedure when using my above-described lock washer there is no problem. However, it is possible that due to the construction of the washer an attempt will be made to tighten it in another manner. Because the washer is basically a helically-wound strip of flat wire, the surface furthest away from the box wall, the surface subject to view during installation, exhibits a cut end of flat wire. An electrician is apt to place the tip of the screwdriver against this edge and strike it with a hammer to force the turning of the washer. In so doing, the helically-wound wire may uncoil to too great an extent and the washer may have to be discarded.

For this reason, in accordance with the principles of the present invention, a locking tab is provided on the washer itself. This tab is a radial extension of the lower convolution and is bent upward to fit between two of the gripping tabs extending from the upper convolution. The locking tab, in the illustrative embodiment of the invention, engages the upper convolution near its end. This has the effect of rigidly attaching the end of the upper turn to that part of the wire coil beneath it. In fact, the entire upper turn is a rigid unit, and even if the upper edge of the strip is struck the washer turns without unfurling. Because the upper turn is still free for relative slight rotational movement with respect to the lower turn the dual locking characteristic of the lock washer is not lost even though the upper turn is in fact a rigid unit. Thus, the locking tab insures that the washer will not be deformed during installation by an absent-minded technician, without however destroying any of the beneficial characteristics of the washer.

Because of the locking tab, however, the manufacturing process requires more steps than merely the coiling of a wire strip followed by the stamping of it to form the gripping tabs For example, the locking tab must be bent to engage the upper turn of the coil. And the stamping process must not destroy the tab after it is bent, if the bending step is first, or before it is bent, if the stamping step is first. Moreover, an additional punching operation may be required to form a slot on the side (interior or exterior) of the upper end of the coil into which the bent tab may fit. Thus, all things considered, the manufacturing process for constructing a helically-wound lock washer with a locking tab is considerably more complex than the process for constructing the simpler lock washer disclosed in my above-identified application.

In accordance with the principles of my invention a slot is punched along the edge of the wire strip, before it is coiled, near that end which in the final coiled configuration is part of the upper turn. (At the same time, this end of the strip is rounded to further insure that an electrician will not strike it.) The strip is then coiled on a threaded mandrel. A tab forming punch then strikes a portion of the lower turn (an exterior section in the illustrative embodiment of the invention) and forces it to be bent up into the tab slot previously stamped near the upper end of the coil. After the locking tab engagement is made a shearing punch and die forms a series of notches and gripping tabs with biting edges on the coiled strip. The interactions between the various punches and dies is described in much greater detail below.

Before the flat wire strip is coiled it is necessary to form a beveled V-shape along that edge which will subsequently define the threaded central bore. In my above-identified application the strip is shown with such a beveled edge. While such an edge may be formed in accordance with prior art techniques I have discovered a particularly advantageous method for doing so. The simplest process for forming the beveled edge would appear to be stamping, or punching. The strip may be placed on a die whose upper surface is flat but inclined upward directly beneath the edge of the strip to be beveled. A shear punch may then be forced downward against the strip, the lower surface of this punch being flat but inclined downward directly above that edge of the strip to be beveled. When the die and punch surfaces come against each other the beveled edge will be formed from the previously straight edge. This deceptively simple process has one major drawback. In forming the beveled edge the wire material is not cut away but merely squeezed together. The material must flow somewhere. Unfortunately, the material is apt to flow in such a manner that the punch is pushed away from the die. The force which is generated by the flowing metal is exceedingly large. In fact, early punches used experimentally in this manner flow off the die with considerable force when contact was made; the heavy securing bolts were completely severed.

To overcome this difficulty I provide a groove or indentation in the shear punch mechanism. The mechanism consists of a vertically flat blanking punch having various punch forms thereon and at its upper end the beveled-edge forming shear punch. The sheet stock is first fed up against the flat blank wall of the punch. This wall is used as a stop to obtain the exact width of material required. As the mechanism is lowered the flat blanking punch fits flush against the vertical end of the die, on top of which rests the sheet stock from which the wire strip is to be formed. As the blanking punch falls the various punch forms cut rounded ends and the tab slot on the sheet stock. As the blanking punch continues to fall the shear punch strikes the sheet stock and exposes the recess to cut off a strip and at the same time to form a beveled edge. It is at this time that the strip would be forced out against the blanking punch to break the securing bolts. To eliminate this problem the blanking punch is provided with a groove or recess into which the metal may flow as the strip grows in width. Because the groove is included in the blanking punch it is possible to utilize a simple punching mechanism for forming the rounded edges, the locking tab slot, and the beveled edge all in a single operation.

It is a feature of this invention to provide a lock washer having gripping tabs and a screw-threaded central bore, with a plurality of helically-coiled wire strip convolutions and a locking tab for securing the upper end of the wire strip to the strip material beneath it.

It is another feature of this invention to provide a series of apparatus interacting with each other in such a manner that the wire strip is cut from sheet stock, wound and punched such that the final lock washer may be fabricated in an exceedingly simple and efficient manner.

It is a still further feature of this invention to provide a mechanism for cutting a wire strip from sheet stock, cutting it with a punch form, and forming with a shear punch a beveled edge thereon, all in a single operation.

Further objects, features and advantages of the invention will become apparent upon consideration of the following detailed description in conjunction with the drawing in which:

FIGS. 8–28 depict illustrative mechanisms for constructing the lock washer of FIG. 3.

Figure 1:
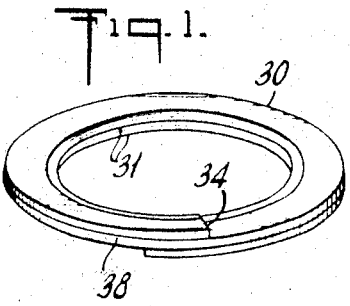
FIG. 1 is a perspective view illustrating a helical coil of flat wire material employed to form a lock washer in accordance with the invention disclosed in my above-identified application.
Figure 2:
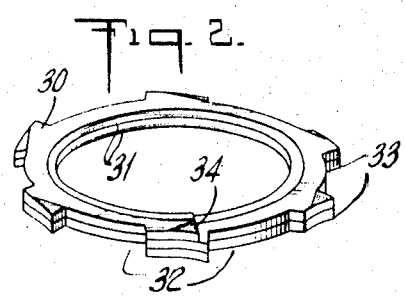
FIG. 2 is a perspective view of the final lock washer constructed from the helical coil of FIG. 1, and disclosed in my above-identified application.

In my above-identified application the first step in constructing the lock washer of FIG. 2 is to form a helical coil 30 from a straight strip of stock material as shown in FIG. 1. The material is substantially rectangular in cross-section, except that one lengthwise edge 31 is beveled. As the strip is wound a screw-threaded central bore is formed. The coil is then stamped or punched on a die. Notches 32 are cut out along the outer periphery of the coil. In addition, in the same step the remaining material at the periphery of the unit is bent slightly to form gripping teeth or tabs 33. The over-all assembly is similar to that of the prior art. But the only wasted material is that cut out of notches 32. And because of the initial beveled edge of the wire strip 30, which strip is used to form the washer, a threading operation is not required. In addition to the advantages in the fabrication of the washer, the completed washer exhibits an unusual characteristic—it functions in practice as two separate lock washers. As the washer is turned clockwise from above, the teeth of the lower turn of the helix grip the connecting surface, such as the wall of an outlet box. After the lower convolution stops turning the upper convolution still turns slightly if sufficient force is applied. While it may rotate only silghtly with respect to the lower turn it functions as a second lock washer. This dual locking characteristic is described in greater detail in my above-identified application.

In practice, the washer is tightened by placing the tip of a screwdriver in one of the notches 32 against the upper section of one of the gripping tabs. As the screwdriver is struck with a hammer the washer is turned. It should be noted, however, that end 34 of the metal strip is in full view at the top of the washer. An absent-minded individual might mistakenly place the screwdriver against this edge rather than against the of the biting tabs. In such a case, if sufficient force is applied, after the teeth grip the outlet box wall the washer may unravel and have to be discarded.

Figure 3:
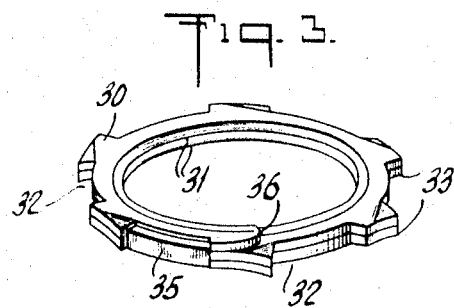
FIG. 3 is a perspective view of a lock washer constructed in accordance with the principles of the present invention.
Figure 4:
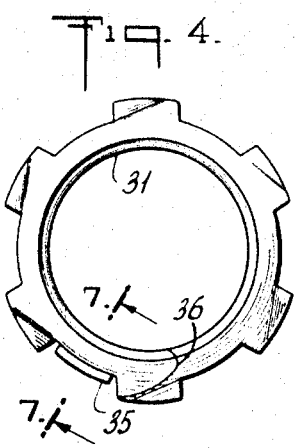
FIG. 4 is a top plan view of the lock washer of FIG. 3.
Figure 5:
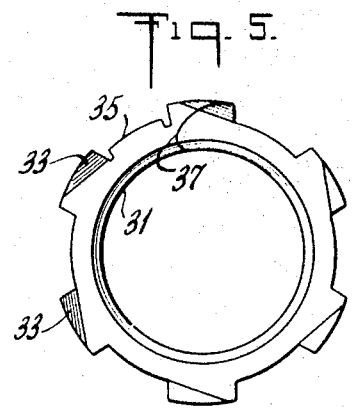
FIG. 5 is a bottom plan view of the lock washer of FIG. 3.

To eliminate this possibility the improved lock washer of the present invention, shown in FIGS. 3–7, is different from the washer of FIG. 2 in two major respects. First, end 36 in FIG. 3 is rounded rather than being straight as is end 34 in FIG. 2. (The lower end of the coil can also be rounded as shown in FIG. 5 although this is not as important.) With a rounded edge the installer is more likely to place his screwdriver against the biting edges. But this is not a sufficient guarantee and for this reason my important washer includes a locking tab 35. With this tab it may not even be necessary to provide a rounded edge because the tab prevents the uncoiling of the washer even if the upper end of the helix is struck.

Figure 6:
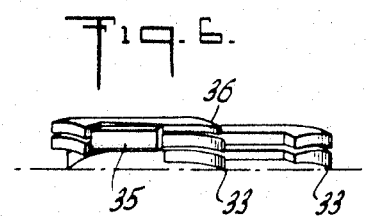
FIG. 6 is an elevational view of the lock washer of FIG. 3.
Figure 7:
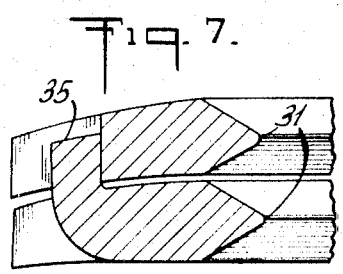
FIG. 7 is a sectional view of the lock washer of FIG. 3 taken along the line 7—7 in FIG. 4.

While the six notches of the washer of FIG. 2 are formed by punching through the entire coil at six sections on its periphery, in the washer of FIG. 3 only five of these notches are formed. The sixth notch is similar to the other five only in that the upper turn of the wire strip is cut through. The material in the lower turn directly beneath the half-notch is not cut out. Instead, it is bent up into the notch (slot) in the upper turn. (Alternatively, the lower turn may contain the notch and the material in the upper turn may be bent down.) Thus, the upper end of the coil is in effect locked to the material directly underneath it and cannot unravel if it is struck at its end 36. The washer still exhibits the dual locking characteristic. The upper washer is a rigid unit which can be viewed best by following the helix of FIG. 1 from end 34 all the way around to approximately that part indicated at 38. The second washer extends from this point to the lower end of the helical strip. These two washers can move slightly relative to each other. FIGS. 4, 5 and 6 show three different views of the washer. The sectional view of FIG. 7 is included in the drawing to show the tab construction. The cross-hatched area represents that part of the washer cut by line 7—7 in FIG. 4. The two areas adjacent locking tab 35 represent the end view of the gripping tab to the left of the locking tab in FIG. 4. In FIGS. 6 and 7 a considerable spaces is shown between the coil layers. In construction, this dimension would be minial but it is shown exaggerated in the drawing for the sake of clarity.

Although the construction of the washer is easily understood it is readily apparent that the method for making it is considerably more complex than that required for fabricating the washer of FIG. 2. After the wire strip is wound it is not sufficient to provide a single punching operation. The problem arises with the notch in the upper turn near edge 36. While this notch must be cut out, the material below it, which forms locking tab 35, must not be cut out. It is difficult to build a punch which will form five full notches 32 and an additional half-notch. Moreover, even after the half-notch is formed a punching operation is required to form the locking tab 35 itself. This, too, is not a simple matter particularly if all punching operations are to be performed while the helical coil is held in place on a single mandrel.

Because of the difficulty in forming five full notches together with one half-notch, before the wire strip is wound a tab slot is formed in it. The strip 30 which is used to form the lock washer is shown in FIG. 12. This strip is cut from sheet stock. The two ends are rounded as shown and lengthwise edge 31 is beveled. Before the strip is wound in a coil, however, tab slot 51 is formed. If the strip of FIG. 12 is wound as shown in FIGS. 1 or 3, it is evident that in the teeth forming step it is only necessary to punch out five full notches 32. In this step it is not necessary to form a half-notch 51 because it is cut in the strip even before the strip is wound. The locking tab 35 may be constructed merely by bending up that portion of strip 30 immediately below slot 51 in the wound configuration. Thus, the first step in the process is to form the strip 30 shown in FIG. 12. The strip is then wound, and following the formation of the coil the five notches 32 are punched out and the locking tab is bent up. (Preferably, the tab is formed before the notches are punched out.) The various figures on sheet 2 of the drawing show the method for obtaining stock strip 30. Sheet 3 of the drawing shows the manner in which the strip may be wound on a mandrel. Sheets 4 and 5 show how notches 32, gripping tabs 33 and locking tab 35 may be formed while the helical coil is contained on the same mandrel.

Referring to FIG. 8 it is seen that sheet stock 45 is moved along the upper surface of die 48 toward blanking punch 40. The blanking punch fits snugly against the vertical end of the die. The upper rear end 49 of the die has a shape which is shown most clearly in FIG. 11. It is flat near the blanking punch and inclined upward slightly away from it. Sheet stock 45 must slide over the little hump thus formed on the upper surface of die 48. For this reason within strip guides 46 there are two stock lift pads 47. These pads not only minimize the friction of the sheet stock against the die, but in addition lift the stock sufficiently such that it slides over the hump and comes to rest against blanking punch 40.

The rear vertical end of the die is rounded on both sides and includes a notch such that punch forms 43 and 44 can be forced down against the die. As the blanking punch is forced down the punch forms cut the sheet stock to provide the two rounded ends and tab slot 51. This is shown most clearly in FIG. 9 where punch form 44 is shown cutting the sheet stock. Scrap pieces 52 and 53 are cut out and may be thrown away. Another piece such as 52 is cut away by punch form 43 if the lower end of the washer is to be rounded as is end 36.

As the blanking punch 40 continues to fall down the cutting edge of shear punch 41 bites into the sheet stock. As seen most clearly from the perspective view of FIG. 10 and the side view of FIG. 11, shear punch 41 and die 48 causes strip 30 to be cut from the sheet stock and at the same time to have its edge 31 beveled.

Recess or groove 42 is included in the blanking punch as shown in FIGS. 8–11. In the formation of the beveled edge the strip material is squeezed. The metal must flow somewhere, and in fact it is projected in a horizontal direction toward the blanking punch. Without recess 42 the flowing metal is forced against blanking punch 40 with such force that the punch may be broken off whatever mechanism (not shown) holds it in place against die 48. Because of the positioning of recess 42, however, in the blanking punch just below the lower surface of the shear punch, the squeezed metal flows into the recess as shown in FIG. 11 without applying any force against the blanking punch. Thus, in a single step, the falling motion of the punch unit, the strip 30 of FIG. 12 is completely formed with its rounded ends, tab slot and beveled edge.

The blanking punch is preferably not raised at this time for the purpose of gaining access to the cut strip 30. Because the outer edge of the strip is fitted into recess 42 it may not be advisable to lift the blanking punch to gain access to strip 30. Instead, the punch remains stationary and a pusher rod used to push the strip out from between shear punch 41 and die 48.

FIGS. 8–11 merely show illustrative apparatus to carry out the first step in the over-all process of fabricating the lock washer of FIG. 3, namely, the formation of the strip 30 as shown is in FIG. 12. The remaining FIGS. 12–28 show illustrative apparatus for performing the remaining steps in the fabrication process.

FIG. 13 illustrates generally the manner in which the various steps of my method of fabrication are carried out. Circular platform 70 contains four punch and mandrel assemblies, to be described in greater detail below. Only the upper portions of mandrels 57 are shown in FIG. 13. The platform rotates and makes one complete revolution in four steps. At each of the four stations certain operations are performed. In the remaining figures of the drawing various units are shown as operating upon strip 30. Some of these mechanisms are included in the four punch and mandrel assemblies which move from station to station. Others, however, are unique to individual stations. While various units are shown in the drawing, and described as being included at particular stations, the mechanisms for operating these units are not shown. These mechanisms will be apparent to those skilled in the art.

At station 1 strip 30 is formed as shown by numerals 40, 41, 45 and 46 in FIG. 13. As described above, strip 30 is forced out of the punch and die assembly and wound around a threaded mandrel 57. A pusher rod 62, as seen in FIGS. 14–16, has an end which fits flush against end 36 of strip 30. The pusher rod has the same cross-section as strip 30 and, consequently, can move between shear punch 41 and die 48 to force the strip around the mandrel.

Threaded mandrel 57 includes a shaft which is extended through a center bore in shearing punch 56. The details of the shearing punch and the additional units between the mandrel and platform 70 need not be understood at this point for an appreciation of the manner in which the strip is coiled around the mandrel. At station 1 a coiling die 58 is lowered around the mandrel and on top of this die is placed a plate 59. This is shown most clearly in the perspective drawing of FIG. 18. FIG. 17 is a cross-section of the complete unit, with the coiling die 58 and plate 59 lowered into position, seen along line 17—17 of FIG. 14. It will be noted that coiling die 58 includes a strip quide 61. Pusher rod 62 forces stock strip 30 into this guide and as it is forced in, it is wound around threaded mandrel 57. Coiling die 58 functions to bend the strip into a helical shape as it tarvels around the grooves in the threaded mandrel. The lower surface of plate 59 includes a helical angle guide 60. In forming a helix in the manner disclosed in the drawing the most difficult part of the process is at the beginning. The helical angle guide prevents the front end of the stock strip from rising out of the grooves of the mandrel, and forces the strip down as it is pushed in. In FIG. 17 the strip is shown completely wound.

FIGS. 14–16 show the coiling in three stages. In FIG. 14 the strip is shown just entering strip guide 61. Although the top of shearing punch 56 is visible it need not be considered in the coiling process since the strip is wound only around the threaded mandrel which is above the shearing punch as seen in FIG. 17. In FIG. 15 the strip is shown approximately half-wound. Finally, in FIG. 16 the strip is shown fully wound on the mandrel and resting on top of shearing punch 56. It should be noted that pusher rod 62 is pushed into strip guide 61 far enough such that the top plan view of the wound strip comprises two concentric circles, with rounded end 36 and tap slot 51 being visible.

Platform 70 is them rotated and the punch-mandrel assembly is moved to station 2. FIG. 19 shows the complete assembly with the previously wound helical coil on the mandrel. The shearing punch 56 consists of a series of six punch cutters 82 and six notches 84, shown most clearly in FIG. 21. Around the shearing punch is an annular tab-punch base 71 having a tab forming punch 66, shown most clearly in FIG. 23. Two list pins 67 are extended down from tab-punch base 71 through punch holder 65 to platform 70. At station 2 the locking tab is formed. It will be noted from FIG. 23 that the tab forming punch 66 extends slightly inward past the inner circumference of the annular tab-punch base 71. The annular base fits over threaded mandrel 57 and the tab forming punch 66 fits into one of the notches 84 of the threaded mandrel. The tap forming punch, however, does not extend so far inward from the base 71 that it touches the mandrel. There is a space between the inner surface of the tab forming punch 66 and the vertical surface of the notch 84 into which it fits, as clearly seen from FIG. 21, a top view of the assembly of FIG. 19 taken along the line 21—21. The coiled strip 30 is wound on the mandrel at station 1 such that tab slot 51 is directly over the notch 84 which carries the tab forming punch.

At station 2 pins 67 are pushed up from the bottom of platform 70 through punch holder 65, as seen in FIG. 20. Before the tab forming punch is forced up, however, pressure pad 68 is lowered. This pad is a hollow cylinder which fits over the mandrel and rests on the upper surface of the coiled strip. The purpose of the pressure pad is to insure that the coiled strip is not forced up off the mandrel during the punching operation. The pressure pad includes a cut-out section 69 directly above tab slot 51. This is shown most clearly in FIG. 22 which is a partial cross-sectional view of the entire assembly taken along line 22—22 in FIG. 20. The purpose of the cutout section in the pressure pad is to allow tab forming punch 66 to be raised without striking the pressure pad.

As seen in FIG. 22 when tab-punch base 71 is raised the tab forming punch 66 strikes against the exterior section of the wire strip just below tab slot 51. Because of the space between the inner face of punch 66 and the innermost surface of the notch 84 which carries punch 66, that piece of metal in the strip which is hit by the punch is bent up into tab slot 51. The tab is shown formed in FIG. 22. The metal strip is cut at the two sides of the tab in order that it be bent up. The two edges 75 and 76 of tab forming punch 66 (FIG. 23) are sharp and serve to cut the sides of the tab. "Edge" 77 is not well defined however, It is a curved surface and serves to force the locking tab to be bent up.

Pressure pad 68 is then raised and the tab forming punch is lowered. At the end of the operation the punch-mandrel assembly with the coiled strip appears as it does at the beginning of the operation in FIG. 19. The only difference is that the locking tab has been formed.

The platform then rotates and the punch-mandrel assembly moves on to station 3. It is at this station that the coiled strip is stamped to form the biting tabs 33 and the five notches 32 of FIG. 3. Shearing punch 56 is directly beneath the lower surface of coiled strip 30. As seen most clearly in FIG. 26, the shearing punch has six punch cutters 82, each with a sloped edge 83, all separated by notches 84. (Tab forming punch 66 is still fitted in the notch directly beneath the previously formed tab 35, as shown in FIG. 27.) Die 80 is forced down over the threaded mandrel to strike the upper surface of strip 30. The die includes six grooves 81 which fit around the six punch cutters 82 on the mandrel. As the die is lowered the five notches 32 in the lock washer are formed. The metal in the coiled strip directly above the five notches 84 in the shearing punch is cut out and falls down as scrap. At the same time the notches which form the biting tabs are formed. Die 80 applies considerable pressure to the coiled strip on the mandrel as it bears down to cut out the notches. The coiled strip is forced down against the upper surface of shearing punch 56 and edges 83 on the punch cutters form the biting tabs 33.

It should be noted that die 80 contains a large groove 81'. Tab forming punch 66 is still in the notch of the shearing punch below the previously formed locking tab. Without groove 81' the die would strike the tab forming punch. With the groove, however, the die fits over the punch. Referring to FIG. 24 it will be seen that the interior shape of the die matches the exterior shape of the shearing punch, except for groove 81' which fits around tab forming punch 66.

FIG. 25 is a sectional view taken along the line 25—25 in FIG. 24, after the die has been forced down to cut notches 32 in the washer and to form gripping tabs 33. FIG. 25 shows the die fitting into the shearing punch notches 84. After the biting tabs are formed the die is raised. The completed lock washer is contained on the threaded mandrel. It is screwed on, however, and a mechanism must be provided for screwing it off. This is accomplished at station 4.

Thus far threaded mandrel 57 has been stationary in the over-all process. The mandrel, however, is forced up slightly at station 4. Rod 85, which connects the mandrel to platform 70, is forced up at station 4 as shown in FIG. 27. The purpose of raising the mandrel is to disengage the completed lock washer from shearing punch 56 to facilitate the screwing off of the washer from the mandrel. Socket tool 86 is lowered as the mandrel is raised. The socket tool is a cylindrical wrench whose inner surface matches the outer surface of the lock washer. After the socket tool is fitted over the washer it is rotated counterclockwise as shown in FIG. 28. As it rotates the washer is screwed off the threaded mandrel. Once it is screwed off the socket tool moves over to a bin, not shown, where the completed lock washer falls down out of the tool. Rod 85 is then lowered and platform 70 moves once again to return the mandrel-punch assembly to station 1 for the fabrication of another lock washer.

The various punch and die arrangements disclosed in the drawing are particularly advantageous because of their low tooling cost. Not only is there a great savings in the cost of the metal required to make the washers, since there is very little waste scrap, but in addition the set-up costs are minimal. Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A method for making a threaded lock washer comprising the steps of:
    (1) cutting a strip of lengthwise material with at least one of the ends being rounded and containing a cut-out slot along one of the lengthwise edges near said rounded end,
    (2) forming a bevel shape along the other of said lengthwise edges,
    (3) winding said lengthwise material around a threaded mandrel to form a helical coil with a central threaded opening and an uppermost turn having said cut-out slot at the exterior circumference thereof, said threaded mandrel being supported by a shearing punch of larger diameter having a plurality of punch cutters with sloped edges at the tops thereof separated by a series of notches, said lengthwise material being wound around said threaded mandrel such that the lowest turn of said coil abuts the upper surface of said shearing punch and said cut-out slot in said uppermost turn is above a predetermined one of said notches,
    (4) forcing up a tab forming punch fitted loosely in said predetermined shearing punch notch to bend over the section of material in said lowest turn above said predetermined notch into said cut-out slot in said uppermost turn,
    (5) forcing down on said coiled material a die having a series of grooves conforming to said punch cutters in said shearing punch for cutting out the material in said coil above the notches in said shearing punch and for causing the remaining material in said lowest turn to conform to the shape of the surface of said shearing punch, and
    (6) unscrewing said coiled material from said threaded mandrel.

2. A method for making a threaded lock washer comprising the steps of:
    (1) cutting a strip of lengthwise material with at least one of the ends being rounded and containing a cut-out slot along one of the lengthwise edges near said rounded end,
    (2) forming a bevel shape along the other of said lengthwise edges,
    (3) winding said lengthwise material into a plurality of side-by-side abutting but relatively slidable turns in accordance with a screw thread convolution to form a helical coil with a central threaded opening and an uppermost turn having said cut-out slot at the exterior circumference thereof,
    (4) bending up a section of said material along the exterior circumference of the lowest turn in said coil to form a locking tab fitted into said cut-out slot in said uppermost turn, and
    (5) forming a series of tabs extending radially from the outer periphery of said turns and bent at an incline with respect to a plane perpendicular to the axis of said central opening, said tabs projecting axially beyond said lowest turn of said coil.

3. A method for making a threaded lock washer comprising the steps of:
    (1) cutting a strip of lengthwise material containing a cut-out slot along one of the edges,
    (2) forming a bevel shape along the other of said lengthwise edges,
    (3) winding said lengthwise material to form a helical coil with a centrally threaded opening,
    (4) bending up a section of the material in said coil to form a locking tab fitted into said cut-out slot, and
    (5) forming a series of gripping tabs extending outwardly and being inclined with respect to the plane of said coil.

4. A method for making a lock washer comprising the steps of:
    (1) cutting a strip of lengthwise material,
    (2) winding said strip into a plurality of side-by-side abutting but relatively slidable turns to form a helical coil,
    (3) bending a portion of the material in one of said turns to grip the adjacent turn, and
    (4) forming a series of biting teeth extending radially and axially away from the center of said coil.

5. A method for making a threaded lock washer comprising the steps of:
    (1) cutting a strip of lengthwise material,
    (2) forming a bevel shape along one of the lengthwise edges of said strip,
    (3) winding said strip into a plurality of side-by-side abutting but relatively slidable turns in accordance with a screw-thread convolution to form a helical coil with a central threaded opening,
    (4) bending a portion of the material in one of said turns to grip the adjacent turn, and
    (5) forming a series of biting teeth extending radially and axially away from the center of said coil.

6. A method for making a threaded lock washer in accordance with claim 5 further including the step of:
    (6) forming a slot in said adjacent turn for receiving the bent portion formed in step (4).

7. A method for making a threaded lock washer in accordance with claim 6 wherein said bent portion is bent in step (4) in an axial direction opposite to that of the direction of the tabs formed in step (5).

8. A method for making a threaded lock washer in accordance with claim 7 wherein the portion of said material bent in step (4) is on the outer periphery of said coil.

9. An apparatus for making a threaded lock washer from sheet stock comprising means for cutting a strip of lengthwise material from said sheet stock, said strip having at least one rounded end and a cut-out slot along one of the lengthwise edges near said rounded end, means for forming a bevel shape along the other of said lengthwise edges, a threaded mandrel, a shearing punch having a diameter larger than the diameter of said threaded mandrel and a plurality of punch cutters with sloped edges at the tops thereof separated by a series of notches, means for winding said lengthwise material around said threaded mandrel to form a helical coil with a central threaded opening and an uppermost turn having said cut-out slot at the exterior circumference thereof, said winding means winding said material around said threaded mandrel such that the lowest turn of said coil abuts the upper surface of said shearing punch and said cut-out slot in said uppermost turn is above a predetermined one of said notches, a tab forming punch fitted loosely in said predetermined shearing punch notch, means for forcing up said tab forming punch to bend over the section of material in said lowest turn above said predetermined notch into said cut-out slot in said uppermost turn, die means having a series of grooves conforming to said punch cutters in said shearing punch for bearing down on said coil to cut out the material in said coil above the notches in said shearing punch and to cause the remaining material in said lowest turn to conform to the shape of the upper surface of said shearing punch, and means for unscrewing said coiled material from said threaded mandrel.

10. An apparatus for making a threaded lock washer from sheet stock comprising means for cutting a strip of lengthwise material from said sheet stock, means for forming a bevel shape along one of the lengthwise edges of said strip, means for winding said lengthwise material to form a helical coil mith a central threaded opening defined by the beveled edge of said strip of material, means for bending a section of the material in one turn of said coil to engage an adjacent turn, and means for stamping said coiled material to form a series of gripping tabs extending radially and axially away from the center of said coil.

11. An apparatus for making a threaded lock washer from sheet stock in accordance with claim 10 further including means for cutting a slot in said adjacent turn, said bending means being operative to bend said section of material to fit into said slot.

12. An apparatus for making a threaded lock washer from sheet stock in accordance with claim 11 wherein said cutting means is further operative to round off at least one end of said strip of material.

13. An apparatus for making a threaded lock washer from sheet stock in accordance with claim 11 wherein said stamping means including a shearing punch for supporting said coil and having a plurality of punch cutters with sloped edges at the tops thereof separated by a series of notches, and a die having an inner shape conforming to the exterior shape of said shearing punch for bearing down on said coil supported by said shearing punch.

14. An apparatus for making a threaded lock washer from sheet stock in accordance with claim 13 wherein said bending means includes a tab forming punch fitted loosely into a predetermined one of said shearing punch notches, said winding means winding said coil such that said cut-out slot is supported by said shearing punch directly above said predetermined notch, and means for forcing said tab forming punch to move within said predetermined notch against said section of material to be bent.

References Cited

UNITED STATES PATENTS

| | | | |
|---|---|---|---|
| 1,784,142 | 12/1930 | Hosking | 10—86 |
| 1,822,600 | 9/1931 | Olson | 10—86 |
| 1,845,272 | 2/1932 | Hosking | 10—73 |
| 1,866,304 | 7/1932 | Hosking | 10—86 |
| 1,927,975 | 9/1933 | Cowlin | 10—86 |
| 1,989,750 | 2/1935 | Garrett | 10—73 |
| 2,306,806 | 12/1942 | Hoopes | 10—86 |
| 2,308,579 | 1/1943 | Williams et al. | 10—73 |
| 2,784,428 | 3/1957 | Curran | 10—86 |
| 3,086,228 | 4/1963 | Mellowes | 10—73 |
| 3,233,262 | 2/1966 | Vollman | 10—86 |
| 3,260,293 | 7/1966 | Gohs | 151—37 |
| 3,283,350 | 11/1966 | Hattan | 10—86 |

CHARLES W. LANHAM, *Primary Examiner.*

E. M. COMBS, *Assistant Examiner.*

U.S. Cl. X.R.

10—86

PO-1050
(5/69)

UNITED STATES PATENT OFFICE
CERTIFICATE OF CORRECTION

Patent No. 3,453,672          Dated July 8, 1969

Inventor(s)  HOWARD C. GOHS

It is certified that error appears in the above-identified patent and that said Letters Patent are hereby corrected as shown below:

Column 4, line 59, after "against" "the" should read --one--;

Column 7, line 15, for "quide" read --guide--;

Column 7, line 47, for "list" read --lift--;

Column 7, line 55, for "tap" read --tab--;

Signed and sealed this 23rd day of December 1969.

(SEAL)
Attest:

Edward M. Fletcher, Jr.
Attesting Officer

WILLIAM E. SCHUYLER, JR.
Commissioner of Patents